United States Patent Office 3,830,887
Patented Aug. 20, 1974

3,830,887
O,O-DILOWERALKYL-O-(1-METHYL-2-PHENYL VINYL)THIOPHOSPHATES
George B. Large, Pinole, and Leland S. Pitt, Sunnyvale, Calif., assignors to Stauffer Chemical Company, Westport, Conn.
No Drawing. Filed Jan. 31, 1973, Ser. No. 328,173
Int. Cl. A01n 9/36; C07f 9/16
U.S. Cl. 260—957          3 Claims

ABSTRACT OF THE DISCLOSURE

A composition of matter is described herein which is used as a synergist for insecticides and methods of use. The composition may be defined by the following generic formula

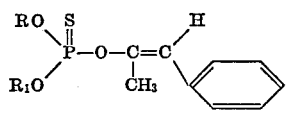

wherein R and $R_1$ can be the same or different and can be selected from lower alkyl having 1 to 4 carbon atoms.

BACKGROUND OF THE INVENTION

Among the many insecticidal compounds, the phthalimidothiophosphates have reached a relatively high degree of commercial success. These compounds are immediately toxic to a large number of insect pests at different concentrations varying with the resistance of the insects mentioned. Some of these compounds are described in U.S. Pat. No. 2,767,194, specifically N-(mercaptomethyl) phthalimide-S-(O,O-dimethylphosphorodithioate).

The endeavor to extend the usefulness of the thiophosphates by increasing their effectiveness and lowering their cost has led to extensive studies on another class of biologically active chemicals, customarily referred to as synergists. Among the many synergists employed, the alkyl oxides, specifically, piperonyl butoxide, have been widely used. These compounds are described in U.S. Pats. Nos. 2,485,681 and 2,550,737.

While these compositions enhance the usefulness of the thiophosphates, they do not measure up to the low cost that is desirable along with increased effectiveness.

BRIEF DESCRIPTION OF THE INVENTION

It has been discovered that the thiophosphate compositions having insecticidal activity can be greatly increased by using a synergist, therefore, having the following formula

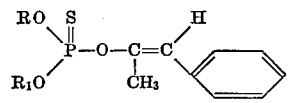

wherein R and $R_1$ can be the same or different and can be selected from lower alkyl having from 1 to 4 carbon atoms.

DETAILED DESCRIPTION OF THE INVENTION

In the practice of the present invention, the synergistic compounds of the present invention are manufactured by reacting an appropriate phenyl compound with certain haloalkylphosphoro derivatives. After the end products are achieved, they are isolated and purified and admixed with the insecticidal compositions. The phenyl group can be in the cis or trans position. The amount of synergist admixed therewith can range from between about 1 to 0.1 to about 1 to 10 parts active compound to synergist composition. After the active compounds and synergists are mixed together, they are applied to a habitat in a conventional manner.

In order to illustrate the merits of the present invention, the following examples are provided:

EXAMPLE 1

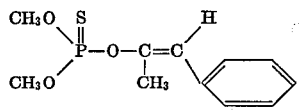

To a stirring solution of 2.4 grams (0.1 moles) NaH in anhydrous tetrahydrofuran was added dropwise a solution of 13.4 grams (0.1 moles) phenyl acetone. After addition the temperature of the mixture was increased to 50° C. for thirty minutes. To this clear solution was added 16.1 grams O,O-dimethylchloridophosphorothioate and the mixture refluxed for one hour. The cooled mixture was diluted with an equal volume of benzene, washed with $H_2O$ three times and dried over anhydrous magnesium sulfate. The solvent was stripped in vacuo to yield 24.5 grams (92%) of crude product.

EXAMPLE 2

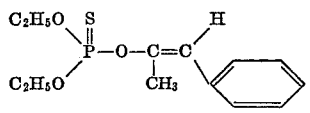

The procedure of Example 1 was repeated in its entirety except O,O-diethylchloridophosphorothioate was used instead of the O,O-dimethylchloridophosphorothioate.

INSECTICIDAL EVALUATION

A. House fly [Musca domestica (L.)]

The following procedure was used to test both susceptible and S-chlorothion resistant houseflies. Stock solutions containing 100 μg./ml. of the toxicant and 500 μg./ml. of the synergist are prepared using appropriate solvents. Toxicant and synergist are combined in a 1 part toxicant: 5 parts synergist ratio by adding equal aliquots of the stock solutions to one ml. of a 0.2% peanut oil in acetone spreading solution in a glass Petri dish 60 mm. in diameter. The toxicant/synergist film residue forms in the Petri dish as the solvents evaporate. The Petri dishes are placed in a circular cardboard cage, closed on the bottom with cellophane and covered on top with cloth netting. Twenty-five female house flies are introduced into the cage and the percent mortality is recorded after 48 hours. $LD_{50}$ values are expressed in terms of μg. per 25 ♀ flies. The aliquots are varied to achieve desired toxicant/synergist concentrations ranging from 100 μg. toxicant/500 μg. synergist per Petri dish to that at which 50% mortality is obtained. If test compound exhibits favorable synergistic activity, tests are repeated using progressively lower toxicant: synergist ratios. The process is repeated until synergism is no longer detected. Controls are identical to the above with the exception that the synergist is omitted.

B. German Cockroach [Blattella germanica (Linne)]

Ten-month-old nymphs are placed into a circular cardboard cage sealed on one end with cellophane and covered by cloth netting on the other. Equal aliquots of the toxicant and synergist dissolved in an appropriate solvent, are diluted in a 50–50 acetone-water solution. Test concentrations for both toxicant and synergist range from 0.1% to that at which 50% mortality is obtained. Each of these aqueous suspensions are sprayed onto the insects, through the cloth netting, by means of a hand spray gun. Percent mortality is recorded after 72 hours and the $LD_{50}$ values are expressed as percent of toxicant in the aqueous spray.

C. Lygus Bug [*Lygus hesperus* (Knight)]

Same as for the German cockroach (B) except that the test concentrations range from 0.05% to that at which 50% mortality is obtained.

D. Black Bean Aphid [*Aphis fabae* (Scop.)]

Nasturtium (Tropaeolum sp.) plants, approximately 2–3 inches tall, are transplated into sandy loam soil in 3 inch clay pots and infested with 50–75 aphids of mixed ages. Twenty-four hours later they are sprayed, to the point of runoff, with aqueous suspensions of the toxicant and synergist. The suspensions are prepared as in previously described tests (B and C). Test concentrations for both toxicant and synergist ranged from 0.05% to that at which 50% mortality is obtained. Mortality is recorded after 48 hours and the $LD_{50}$ values are expressed as percent active ingredient in the acetone-water solutions.

E. Salt-marsh Caterpillar [*Estigmene acrea* (Drury)]

Test solutions are prepared in an identical manner and concentrations are the same as those for the German cockroach (B). Sections of bitter dock (*Rumex obtusifolius*) leaves, 1–1.5 inches in length are immersed in the test solutions for 10–15 seconds and placed on a wire screen to dry. The dried leaf is placed on a moistened piece of filter paper in a Petri dish and infested with five third-instar larvae. Mortality of the larvae is recorded after 72 hours and the $LD_{50}$ values are expressed as percent active ingredient in the acetone-water solutions.

F. Tobacco Budworm [*Heliothis virescens* (F.)]

Same as the Salt-marsh Caterpillar (E), except that leaves of Romaine lettuce (*Latuca sativa*) are utilized as the host plant rather than bitter dock.

G. Beet Armyworm [*Spodoptera exigua* (Hubner)]

Same as the Salt-marsh Caterpillar (E), except that leaves of Romaine lettuce (*Latuca sativa*) are utilized as the host plant rather than bitter dock.

H. Confused Flour Beetle [*Tribolium confusum*]

Equal concentrations of the chemicals, diluted in acetone, were pipetted onto the bottom of glass Petri dishes, two inches in diameter. To insure even distribution of the chemicals on the glass, 1 ml. of an acetone solution containing 0.02% peanut oil was also placed in each of the dishes. After the acetone had evaporated, 25 adult beetles were confined in the dishes. Mortality was recorded after 48 hours, and the $LD_{50}$ values are expressed in terms of μg. of toxicant/Petri dish.

I. Two-spotted Mite [*Tetranychus urticae* (Koch)]

Same as for the black bean aphid (D) except that pinto beans (Phaseolus sp.) are utilized as the host plant rather than nasturtiums.

J. Mosquito [*Culex pipiens quinquefasciates*]

One hundred milliliters of an aqueous solution of the test compounds, at a concentration of 0.5 p.p.m., are placed in a 6 ounce, number 67 Dixie paper cup. Ten late third or early four instar larvae of the mosquito are placed in each cup and the cups are stored at 70° F. for three days, at which time mortality counts are made. Compounds which are active at 0.5 p.p.m. are retested at progressively lower concentrations until an $LD_{50}$ value is determined.

K. Cabbage Looper [*Trichoplusia ni*]

Same as Salt-marsh caterpillar (E), except that leaves of white cabbage (*Brassica oleracla*) are utilized as the host plant rather than bitter dock.

The results of these tests are provided in Table I.

TABLE 1.—APPROXIMATE $LD_{50}$ VALUES
[Expressed in amount of toxicant]

| Compounds | HF,[1] μg./25 ♀ flies | HF,[2] μg./25 ♀ flies | Percent | | | | | | | | 2 SM, percent | | Mo, p.p.m. |
| --- | --- | --- | --- | --- | --- | --- | --- | --- | --- | --- | --- | --- | --- |
| | | | GR | LB | BA | SMC | TBW | BAW | CL | CFB | Adults | Eggs | |
| N-(mercaptomethyl)phthalimide-S-(O,O-dimethylphosphorodithioate) | 3.5 | >300 | .03 | .003 | .002 | >2.0 | 1.0 | .1 | .1 | | .005 | .03 | .4 |
| N-(mercaptomethyl)phthalimide-S-(O,O-dimethylphosphorodithioate) plus Example 1 (1:1) | | | .03 | .003 | .0004 | .05 | .005 | .005 | .001 | | .005 | .03 | .4 |
| N-(mercaptomethyl) phthalimide-S-(O,O-dimethylphosphorodithioate) plus Example 1 (1:5) | 2.5 | 20 | | | .0004 | | | | | | .005 | >.03 | |
| Example 1 | >100 | >500 | >.1 | >.05 | .25 | .15 | .5 | >.1 | .05 | >200 | >.05 | >.05 | >10.0 |
| N-(mercaptomethyl)phthalimide-S-(O,O-dimethylphosphorodithioate) plus Example 2 (1:5) | 2.5 | | | | | >.05 | .03 | | | | | | |
| Example 2 | >100 | | | | | >.05 | >.1 | | | | | | |

[1] Susceptible. [2] S-chlorothion resistant.

The compositions of this invention are generally embodied into a form suitable for convenient application. For example, the compositions can be embodied into pesticidal formulations which are provided in the form of emulsions, suspensions, solutions, dusts, and aerosol sprays. In general, such formulations will contain, in addition to the active compound, the adjuvants which are found normally in pesticide preparations. In these formulations, the active compounds of this invention can be employed as the sole pesticide component or they can be used in admixture with other compounds having similar utility. The pesticide formulations of this invention can contain, as adjuvants, organic solvents, such as sesame oil, xylene range solvents, heavy petroleum, etc.; water; emulsifying agents; surface active agents; talc; pyrophyllite; diatomic; gypsum; clays; propellants, such as dichlorodifluoromethane, etc. If desired, however, the active compositions can be applied directly to feedstuffs, seeds, etc., upon which the pests feed. Then applied in such a manner, it will be advantageous to use a composition which is not volatile. In connection with the activity of the presently disclosed pesticidal compositions, it should be fully understood that it is not necessary that they be active as such. The purposes of this invention will be fully served if the composition is rendered active by external influences, such as light, or by some physiological action which occurs when the compound is ingested into the body of the pest.

The precise manner in which the pesticidal compositions of this invention are used in any particular instance will be readily apparent to a person skilled in the art. Generally, the active pesticide composition will be embodied in the form of a liquid composition; for example, an emulsion, suspension, or aerosol spray. While the concentration of the active pesticide composition in the present formulation can vary within rather wide limits, ordinarily, the pesticide composition will comprise not more than about 50.0% by weight of the formulation.

What is claimed is:

1. A compound corresponding to the following generic formula

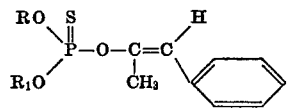

wherein R and $R_1$ can be the same or different and can be selected from lower alkyl having 1 to 4 carbon atoms.

2. A compound as set forth in Claim 1 wherein R and $R_1$ are methyl.

3. A compound as set forth in Claim 1 wherein R and $R_1$ are ethyl.

References Cited
UNITED STATES PATENTS 3,021,352  2/1962  Miller _____ 260—957 X ANTON H. SUTTO, Primary Examiner U.S. Cl. X.R.

424—219